United States Patent Office 3,025,283
Patented Mar. 13, 1962

3,025,283
PROCESS FOR THE POLYMERIZATION OF
VINYL ETHERS
Richard F. Heck and Edwin J. Vandenberg, Wilmington, Del., assignors to Hercules Powder Company, Wilmington, Del., a corporation of Delaware
No Drawing. Filed Sept. 14, 1959, Ser. No. 839,545
8 Claims. (Cl. 260—91.1)

This invention relates to a new process for the production of poly(vinyl ethers) of high molecular weight and high crystallinity.

It is well known that vinyl ethers may be polymerized in bulk or solution with Friedel-Crafts catalysts to yield polymers that vary from viscous liquid to balsam-like or soft resinous-like polymers. Under certain conditions and using boron trifluoride-etherates as catalysts it has been possible to produce a crystalline type of poly(vinyl methyl ether) and poly(vinyl isobutyl ether). While a rubbery poly(vinyl ethyl ether) has been produced, it was not crystalline. In the case of both the balsam-like and crystalline-type poly(vinyl methyl ether) of the prior art, the polymer is completely soluble in cold water and in organic solvents such as methanol, ethanol, acetone, and benzene. Because of the extreme solubility of these prior art vinyl ether polymers, their utility has been considerably limited.

Now in accordance with this invention it has been found that vinyl alkyl ethers may be polymerized to high molecular weight, crystalline polymers by using as the catalyst for the polymerization a sulfate of a metal of groups III–A, IV–B, V–B, VI–B or VIII of the periodic table in combination with an alkoxide of a group III–A or IV–B metal or a metal trialkyl or metal dialkyl hydride or a metal alkyl alkoxide of a group III–A metal. The polyethers so produced are high molecular weight, highly crystalline polymers that are capable of being formed into strong, orientable fibers and films. It is this combination of high molecular weight with high crystallinity that makes it possible to use these polymers in such applications. Hence, the process of this invention provides a means of producing polyethers of greatly enhanced utility.

In accordance with the above findings the invention relates to the process of polymerizing a vinyl alkyl ether which comprises contacting at least one of said ethers with the catalyst formed by mixing a sulfate of a metal selected from the group consisting of the metals of groups III–A, IV–B, V–B, VI–B, and VIII of the periodic table with a metal compound selected from the group consisting of the trialkyls, the alkyl hydrides, the alkyl alkoxides, and the alkoxides of the metals of group III–A and the alkoxides of the metals of group IV–B.

Just what the catalyst species is when a vinyl ether is polymerized with a metal sulfate in combination with a metal alkoxide or alkyl in accordance with this invention is not known. In so far as it has been possible to determine, by elemental and X-ray analyses, there is no apparent reaction when these two catalyst components are mixed. Nevertheless, it has been found that greatly improved results are obtained, not only in the production of a crystalline polymer, but in the production of a much higher molecular weight polymer, when a combination of a metal sulfate and a metal alkyl or alkoxide is used as against the use of the metal sulfate alone. It is possible that the metal alkyl or alkoxide acts as an activator for the metal sulfate, possibly by a reaction occurring at the surface of the metal sulfate. Regardless of the theory as to the catalyst species or the mechanism of the reaction, outstanding results are obtained when vinyl ethers are polymerized with the catalyst of this invention.

As pointed out above, the catalyst used in accordance with this invention is a sulfate of a metal of groups III–A, IV–B, V–B, VI–B or VIII of the periodic table in combination with an alkoxide of a metal of groups III–A or IV–B of the periodic table or in combination with a metal trialkyl, metal alkyl hydride, metal alkoxide or metal alkyl alkoxide of a metal of group III–A of the periodic table. (The periodic chart used in this specification and appended claims for designating the groups and subgroups of the periodic table is that given in the "Handbook of Chemistry and Physics" published by Chemical Rubber Publishing Company, Cleveland, Ohio, on pages 392–3 of the 36th edition.) Typical of the metal sulfates that may be used as one component of the catalyst of this invention are $Al_2(SO_4)_3$, $Ga_2(SO_4)_3$, $TiO(SO_4)$, $VO(SO_4)$, $Cr_2(SO_4)_3$, $Fe_2(SO_4)_3$, $NiSO_4$, etc. Exemplary of the metal trialkyls, metal alkyl hydrides, metal alkoxides, and metal alkyl alkoxides that are used in combination with the metal sulfates are trialkyl aluminums, such as triethylaluminum, tripropylaluminum, triisopropylaluminum, triisobutylaluminum, tri(n-hexyl) aluminum, trioctylaluminum, etc., alkylaluminum hydrides such as diethylaluminum hydride, diisobutylaluminum hydride, etc., and the corresponding gallium alkyls, and aluminum, titanium, etc., alkoxides, such as aluminum methoxide, ethoxide, propoxide, isopropoxide, butoxide, tert.-butoxide, etc., titanium ethoxide, isopropoxide, 2-ethylhexyl titanate, etc., aluminum diethyl ethoxide, aluminum diisobutyl ethoxide, etc. The metal of the metal alkyl or alkoxide may be the same as that of the metal sulfate, or different.

The metal sulfate and the metal alkyl or alkoxide or alkyl alkoxide may be premixed or mixed in situ. Preferably they are mixed in an inert, anhydrous, liquid, organic diluent and then used as such alone or with an additional amount of the metal alkyl or alkoxide for the polymerization. For example, excellent results have been obtained when a small quantity of the metal alkyl or metal alkoxide is first added to the vinyl ether to be polymerized, whereby any traces of impurities such as water, acid, etc., and in the case of the metal alkyls, alcohol, are removed, and then the premixed catalyst combination is added. Because of the adverse effects of water, the metal sulfate is preferably dried before use to eliminate any water of hydration that is sometimes present. Where the metal sulfate, metal alkyl or metal alkoxide is insoluble in the reaction medium, they are preferably used, for optimum results, in a finely divided form, such as a particle size of about 20 microns or less.

The amount of the metal sulfate-metal alkyl or alkoxide catalyst combination used for the polymerization of the vinyl ethers may vary from a minor catalytic amount to a large excess, but generally will be an amount such that the amount of metal sulfate used in the catalyst mixture will be within the range of from about 0.01% to about 10% of the weight of the vinyl ether being polymerized and more preferably will be from about 0.05% to about 2.0%. The ratio of the metal sulfate to the metal alkyl or alkoxide or alkyl alkoxide may be varied over a wide range but preferably will be from about 1:0.1 to 1:5, respectively.

Any vinyl alkyl ether may be polymerized with the above-described catalyst combination in accordance with this invention as, for example, vinyl methyl ether, vinyl ethyl ether, vinyl propyl ether, vinyl isopropyl ether, vinyl n-butyl ether, vinyl isobutyl ether, vinyl tert.-butyl ether, vinyl neopentyl ether, vinyl 2-chloroethyl ether, vinyl 2-methoxyethyl ether, vinyl trifluoroethyl ether, 1-methoxybutadiene, and propenyl alkyl ethers such as propenyl methyl ether, propenyl ethyl ether, propenyl propyl ether, etc.

The polymerization may be carried out with or without a diluent, but for ease of operation, separation of the catalyst from the polymer, etc., it is generally carried out in an inert diluent. Any anhydrous, liquid, organic diluent that is inert under the reaction conditions may be used as, for example, aliphatic cycloaliphatic, or aromatic hydrocarbons, chlorinated hydrocarbons, ethers, esters, etc. Exemplary of such diluents are hexane, heptane, cyclohexane, benzene, toluene, xylene, etc., or a mixture of such hydrocarbons, methylene chloride, chloroform, carbon tetrachloride, ethylene dichloride, chlorobenzene, diethyl ether, diisopropyl ether, ethyl acetate, etc.

The selection of the temperature and pressure used for the polymerization process will depend upon the activity of the specific catalyst being used, the diluent used, etc. In general, the polymerization will be carried out at a temperature within the range of from about $-100°$ C. to about 200° C., and preferably from about $-50°$ C. to about 100° C. and more preferably from about $-20°$ C. to about 50° C. In the same way, while atmospheric pressure or a pressure of only a few pounds may be used, the polymerization may be carried out under a wide range of pressures as, for example, from a partial vacuum to about 1000 pounds, and preferably from about atmospheric to about 500 pounds pressure. Higher pressures may, of course, be used but generally do not appreciably alter the course of the polymerization.

When the polymerization is carried out as described above, the polymer is readily isolated from the solution or slurry of polymer and diluent by simply removing the diluent by evaporation or other such means. Frequently it is desirable to add a stabilizer as the diluent is removed at an elevated temperature. The polymer may then be purified to remove the catalyst residues by washing with an alcoholic or aqueous solution of acid or base or by dissolving the polymer in a suitable solvent, filtering to remove the insoluble catalyst and then separating the polymer from the so-purified solution.

indicated temperature. Where the melting point is given, it is the temperature at which birefringence due to crystallinity disappears. All parts and percentages are by weight unless otherwise indicated.

EXAMPLES 1–12

In each of these examples the catalyst used was premixed by mixing a slurry of the anhydrous (previously heated to remove any water of hydration), finely ground, metal sulfate in n-heptane with a solution of the activator (metal alkoxide) in n-heptane and stirring the mixture at room temperature for one hour prior to use.

The polymerization was carried out in each case by charging a polymerization vessel with a nitrogen atmosphere with 7.5 parts of methyl vinyl ether, 67 parts of methylene chloride in Examples 1–9, 11 and 12 and 17.5 parts of heptane in Example 10 and a specified amount of activator (metal alkoxide). After equilibrating the vessel and contents at the reaction temperature, the catalyst mixture prepared as described above was added. The reaction mixture was then agitated at the reaction temperature for the specified time, after which the catalyst was destroyed by adding 4 parts of a 1 M solution of ammonia in ethanol. Four parts of a 1% solution of 2,4-dihydroxybenzophenone in ethanol was added as a stabilizer and the diluents were removed under vacuum. The crude polymer was washed several times with methanol, then was dissolved in methylene chloride, the solution filtered and the solvent removed.

In Table I is set forth the metal sulfate and metal alkoxide used to prepare the catalyst used in each example and the amount of each, the amount of activator added to the methyl vinyl ether before addition of the premixed catalyst, the reaction time and temperature and the RSV (chloroform at 25° C.) and the percent crystallinity of the polymer as determined by infrared for the crystalline polymer produced in each case.

*Table 1*

| Ex. | Premixed catalyst combination | | | | Additional activator added to monomer | Parts | Reaction time and temp. | Crystalline polymer isolated | |
|---|---|---|---|---|---|---|---|---|---|
| | Metal sulfate | Parts | Activator | Parts | | | | RSV | Percent cryst. by IR |
| 1 | Al₂(SO₄)₃ | 0.342 | Al(Oi-C₃H₇)₃ | 0.204 | Al(Oi-C₃H₇)₃ | 0.204 | 0° C. 5 hrs., 30° C. 16 hrs | 6.05 | 30 |
| 2 | Al₂(SO₄)₃ | 0.342 | Ti(OC₈H₁₇)₄ ᵃ | 0.564 | Ti(OC₈H₁₇)₄ ᵃ | 0.564 | 30° C. 16 hrs | 5.4 | 38 |
| 3 | Ga₂(SO₄)₃ | 0.428 | Al(Oi-C₃H₇)₃ | 0.204 | Al(Oi-C₃H₇)₃ | 0.204 | 0° C. 5 hrs., 30° C. 16 hrs | 5.3 | 33 |
| 4 | TiO(SO₄) | 0.160 | Al(Oi-C₃H₇)₃ | 0.204 | Al(Oi-C₃H₇)₃ | 0.204 | 30° C. 16 hrs | | 32 |
| 5 | TiO(SO₄) | 0.160 | Ti(Oi-C₃H₇)₄ | 0.284 | Ti(Oi-C₃H₇)₄ | 0.284 | 0° C. 4 hrs., 30° C. 16 hrs | 4.4 | 50 |
| 6 | TiO(SO₄) | 0.160 | Ti(OC₈H₁₇)₄ ᵃ | 0.564 | Ti(OC₈H₁₇)₄ ᵃ | 0.564 | 30° C. 16 hrs | 4.4 | 57 |
| 7 | VO(SO₄) | 0.163 | Al(Oi-C₃H₇)₃ | 0.204 | Al(Oi-C₃H₇)₃ | 0.204 | 0° C. 5 hrs., 30° C. 16 hrs | 3.4 | 37 |
| 8 | Cr₂(SO₄)₃ | 0.392 | Al(Oi-C₃H₇)₃ | 0.204 | Al(Oi-C₃H₇)₃ | 0.204 | 30° C. 16 hrs | 4.3 | 47 |
| 9 | Cr₂(SO₄)₃ | 0.392 | Ti(Oi-C₃H₇)₄ | 0.284 | Ti(Oi-C₃H₇)₄ | 0.284 | 0° C. 5 hrs., 30° C. 16 hrs | 5.9 | 48 |
| 10 | Fe₂(SO₄)₃ | 0.400 | Al(i-C₄H₉)₃ | 0.198 | Al(i-C₄H₉)₃ | 0.198 | 30° C. 16 hrs | 6.6 | 36 |
| 11 | Fe₂(SO₄)₃ | 0.400 | Al(Oi-C₃H₇)₃ | 0.204 | Al(Oi-C₃H₇)₃ | 0.204 | 0° C. 5 hrs., 30° C. 16 hrs | | 24 |
| 12 | NiSO₄ | 0.155 | Al(Oi-C₃H₇)₃ | 0.204 | Al(Oi-C₃H₇)₃ | 0.204 | 0° C. 5 hrs., 30° C. 16 hrs | 1.5 | 59 |

ᵃ 2-ethylhexyl titanate.

In many cases some amorphous polymer is prepared along with the crystalline polymer. In order to obtain the highest solvent resistance and tensile strength it is generally advisable to remove the amorphous polymer. This is readily done by washing the polymer with a solvent which dissolves the amorphous polymer, but which does not dissolve the crystalline polymer.

The following examples will illustrate the process of polymerizing vinyl ethers in accordance with this invention to high molecular weight, highly crystalline polymers. The molecular weight of the polymers produced in these examples is indicated by the reduced specific viscosity (RSV) given for each. By the term "reduced specific viscosity" is meant the $\eta sp/c$ determined on an 0.1% solution (0.1 g. of the polymer per 100 ml. of solution) of the polymer in the indicated solvent at the

EXAMPLES 13–15

In these examples various vinyl alkyl ethers were polymerized by the general procedure described in Examples 1–12. In each case 10 parts of the specified vinyl alkyl ether was polymerized using 67 parts of methylene chloride as the diluent in Examples 13 and 14 and diethyl ether, 18 parts, in Example 15. In Table II is set forth the vinyl ether polymerized, the catalyst used, additional activator added and the reaction time and temperature along with the RSV of the crystalline polymer produced in each case (in chloroform at 25° C.)

In each case the crystalline polymer was isolated after removal of the diluent by extraction with hexane to remove any amorphous polymer. The hexane-insoluble polymer was then dissolved in methylene chloride, the solution filtered and the solvent removed.

Table II

| Ex. | Vinyl ether | Premixed catalyst combination | | | Additional activator added to monomer | Parts | Reaction Time and Temp. | RSV of crystalline polymer isolated |
|---|---|---|---|---|---|---|---|---|
| | | Metal sulfate | Parts | Activator | Parts | | | |
| 13 | Isopropyl | $Al_2(SO_4)_3$ | 0.342 | $Al(Oi-C_3H_7)_3$ | 0.204 | $Al(Oi-C_3H_7)_3$ | 0.204 | 0° C. 4 hrs., 30° C. 16 hrs | 9.25 |
| 14 | Isobutyl | $Al_2(SO_4)_3$ | 0.342 | $Al(Oi-C_3H_7)_3$ | 0.204 | $Al(Oi-C_3H_7)_3$ | 0.204 | 0° C. 4 hrs., 30° C. 64 hrs | 2.40 |
| 15 | Tert.-butyl | $Al_2(SO_4)_3$ | 0.342 | $Al(i-C_4H_9)_3$(THF) | 0.198 | $Al(i-C_4H_9)_3$ | 0.198 | 0° C. 5 hrs., 30° C. 16 hrs | 0.27 |

EXAMPLE 16

A polymerization vessel with a nitrogen atmosphere was charged with 13.8 parts of methylene chloride, 2.5 parts of 2,2,2-trifluoroethyl vinyl ether, and 0.05 part of aluminum isopropoxide added as a 0.85 M solution in heptane. The reaction mixture was cooled to 0° C. and, with agitation, an amount of the catalyst mixture described in Example 1, equivalent to 0.017 part based on aluminum was added. Agitation was continued at 0° C. for 3 hours and then at room temperature for 16 hours, after which 2 parts of a 1 M ethanolic solution of ammonia and 1 part of 1% solution of 4,4'-thiobis(6-tert-butyl-m-cresol) in ethanol were added. The reaction mixture was evaporated to dryness in a vacuum and the amorphous polymer was extracted with methanol. The insoluble polymer was purified by dissolving it in acetone, filtering the solution and then evaporating the acetone. The polymer was obtained in the form of a clear film. It was crystalline by X-ray, had a melting point of 128° C. and a carbon and hydrogen analysis of 38.67% and 4.05% respectively (theory is 38.10% carbon and 4.00% hydrogen).

EXAMPLE 17

The catalyst used in this example was prepared by mixing 2.0 ml. of a 0.5 M solution of 2-ethylhexyl titanate in n-heptane with 2.0 ml. of a 0.56 M slurry of anhydrous titanyl sulfate, and agitating the mixture for one hour before using.

A polymerization vessel was charged with 67 parts of methylene chloride and after flushing with nitrogen 0.56 part of 2-ethylhexyl titanate was added as an 0.5 M solution in n-heptane, followed by 10 parts of vinyl methyl ether. The solution was cooled to 0° C. and with agitation, an amount of the above catalyst mixture equivalent to 0.18 part of titanyl sulfate was added. After agitating at 0° C. for 4 hours, the reaction mixture was allowed to warm up to 25° C., and was agitated at this temperature for 18 hours. The catalyst was then inactivated by adding 4 parts of a 1 M solution of ammonia in ethanol and 4 parts of a 1% solution of 4,4'-thiobis(6-tert.-butyl-m-cresol) in ethanol was added as a stabilizer. The diluents were removed under vacuum and the amorphous polymer was extracted from the residue with methanol. The methanol-insoluble polymer was further purified by twice dissolving it in hot methyl isobutyl ketone and cooling to crystallize the polymer and then dissolving it in methylene chloride, filtering and finally removing the solvent. The poly(vinyl methyl ether) so obtained had an RSV of 2.7 (0.1% in chloroform at 25° C.), a melting point of 138° C., and crystallinity of 65% as determined by infrared.

Film was prepared from this polymer by compression molding for 5 minutes at 280° F. and 450 p.s.i. This film had a tensile strength of 3200 p.s.i., and ultimate elongation of 140%, and a tensile modulus of 40,000 p.s.i. After orienting by cold drawing 150% at 25° C., the film had a tensile strength of 10,000 p.s.i., an elongation of 40% and a tensile modulus of 47,000 p.s.i.

What we claim and desire to protect by Letters Patent is:

1. The process of polymerizing a vinyl alkyl ether which comprises contacting said ether at a temperature from about −100° C. to 200° C. with the catalyst formed by mixing a sulfate of a metal selected from the group consisting of the metals of groups III–A, IV–B, V–B, VI–B and VIII of the periodic table with a metal compound selected from the group consisting of the trialkyls of the metals of group III–A of the periodic table, the alkyl hydrides of the metals of group III–A of the periodic table, the alkyl alkoxides of the metals of group III–A of the periodic table, the alkoxides of the metals of group III–A of the periodic table and the alkoxides of the metals of group IV–B of the periodic table, the weight ratio of said sulfate to said metal compound being from about 1:0.1 to 1:5 and said periodic table being the table given on pages 392–393 of the 36th edition of the "Handbook of Chemistry and Physics," published by Chemical Rubber Publishing Company.

2. The process of claim 1 wherein the vinyl alkyl ether is vinyl methyl ether.

3. The process of claim 1 wherein the vinyl alkyl ether is vinyl isopropyl ether.

4. The process of claim 2 wherein the catalyst is that formed by mixing aluminum sulfate with a trialkylaluminum.

5. The process of claim 2 wherein the catalyst is that formed by mixing aluminum sulfate with an aluminum alkoxide.

6. The process of claim 2 wherein the catalyst is that formed by mixing aluminum sulfate with a titanium alkoxide.

7. The process of claim 2 wherein the catalyst is that formed by mixing chromium sulfate with a titanium alkoxide.

8. The process of claim 2 wherein the catalyst is that formed by mixing titanyl sulfate with a titanium alkoxide.

References Cited in the file of this patent

UNITED STATES PATENTS

| 2,827,447 | Nowlin et al. | Mar. 18, 1958 |
| 2,832,759 | Nowlin et al. | Apr. 29, 1958 |
| 2,840,551 | Field et al. | June 24, 1958 |
| 2,846,427 | Findlay | Aug. 5, 1958 |

OTHER REFERENCES

H. G. Deming: Fundamental Chemistry, 2nd edition (1947), page 752.